United States Patent [19]
Meadows

[11] Patent Number: 4,912,391
[45] Date of Patent: Mar. 27, 1990

[54] FLUX-COUPLED IRON DIRECTED BATTERY CHARGER

[75] Inventor: Vernon Meadows, Coral Springs, Fla.

[73] Assignee: Motorola, Inc., Schaumburg, Ill.

[21] Appl. No.: 346,444

[22] Filed: May 1, 1989

[51] Int. Cl.⁴ .................... H02J 7/04; H01M 10/46
[52] U.S. Cl. ............................................. 320/2; 320/51
[58] Field of Search ....................................... 320/2–5, 320/51

[56] References Cited
U.S. PATENT DOCUMENTS

| | | | |
|---|---|---|---|
| 3,086,159 | 4/1963 | Daly et al. | 320/5 X |
| 3,277,358 | 10/1966 | Nicholl | 320/2 |
| 3,938,018 | 2/1976 | Dahl | 320/2 |
| 4,031,449 | 6/1977 | Trombly | 320/2 |

Primary Examiner—R. J. Hickey
Attorney, Agent, or Firm—Michael J. Buchenhorner

[57] ABSTRACT

A flux-coupled, iron directed battery charger charges a battery while avoiding physical contact between the charger and the battery and uses a control circuit that substantially reduces the flow of charging current to the battery when said battery is fully or nearly fully charged.

16 Claims, 2 Drawing Sheets

FLUX-COUPLED IRON DIRECTED BATTERY CHARGER

TECHNICAL FIELD

This invention relates generally to battery chargers and more specifically, to magnetic flux-coupled battery chargers. It is particularly directed toward a magnetic flux coupled battery charged with a means for controlling the charging current that is responsive to the charged state of the batteries.

BACKGROUND ART

It is known that metallic electric contacts used in conventional chargers are subject to environmenal conditions and thus to environmental factors such as corrosion that may deteriorate a charger's performance. There are battery chargers known in the art in which magnetic flux coupling is used and those chargers provide means for controlling the charging of the batteries so that significant charging current ceases to flow in response to the state of charge of the batteries.

SUMMARY OF THE INVENTION

Accordingly, it is an object of the present invention to provide a magnetic flux-coupled battery charger that avoids the problems of using metallic contacts that are exposed to the environment wherein the battery charger is used. It is a further object of the present invention to provide a "smart" battery charger that is able to control the charging current in response to the level of electric charge in the battery being charged. Another object of the present invention is to provide a battery charger that can either operate in a rapid-charge or in a trickle-charge mode, depending on the amount of charge in the subject battery. Still another object of the present invention is to provide a battery charger that can be used in corrosive environment without significant loss of performance.

Briefly, according to the invention, a battery may be charged in a housing that does not require actual physical contact between the battery terminals and charging terminals of the battery charger.

DETAILED DESCRIPTION OF THE PREFERRED EMBODIMENT

Figure 1:
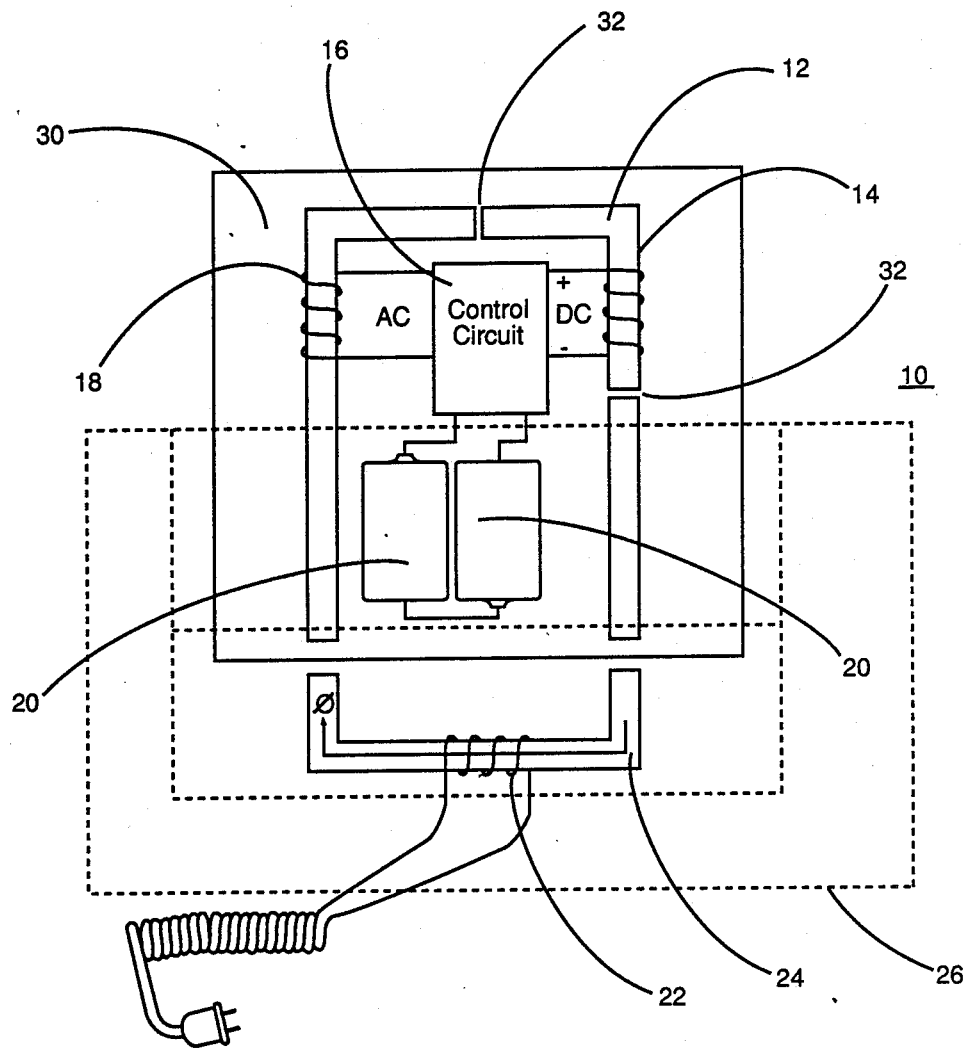
FIG. 1 illustrates the preferred embodiment of the magnetic flux coupled battery charger.

Referring to FIG. 1, a magnetic flux-coupled, iron directed battery charger circuit 10 is illustrated. A first iron-core material 14 is located within battery housing 28. A second iron-core material 24 is located within battery charger housing 26. A primary transformer winding or coil 22 is wound around iron-core material 24. The battery housing 28 is adapted to fit into battery charger housing 26.

The electric cells 20 are also located within battery housing 28. The cells 20 are connected in series between minus and plus terminals in control circuit 16. These terminals provide the electric current required to charge the cells 20.

A secondary transformer winding or coil 18 is wound around iron-core material 14 and each end or terminal of coil 18 is connected to control circuit 16. Thus, when the battery housing 28 is placed within the battery charger housing 26, as shown in FIG. 1, a magnetic circuit is established. Iron-core material 14 and iron-core material 24 provide a path for magnetic flux.

A third transformer winding or coil 30 is wound around iron-core material 14 and has each terminal connected to the control circuit 16. Coil 30 is used, to control the amount of current used to charge cells 20, only in the version of control circuit 16 depicted in FIG. 3, but not in the version of FIG. 2. Air gaps 32 are formed in iron-core material 14 to increase its reluctance. The region of iron-core material 14 defined by the air gaps 32 and coil 30 is referred to as a flux gate 12 and is used to control the flow of flux through the magnetic circuit formed by iron-core material 14 and iron-core material 24.

Alternating current is applied at the terminals of coil 22 to establish a flow of magnetci flux through iron-core material 24 and iron-core material 14. The flux through the portion of iron-core material 14 that is wound by coil 18 establishes an alternating potential difference between the terminals of coil 18. That potential difference is applied to a rectifier in the control circuit 16 for rectification required to charge the battery cells 20 contained in battery housing 28.

Figure 2:
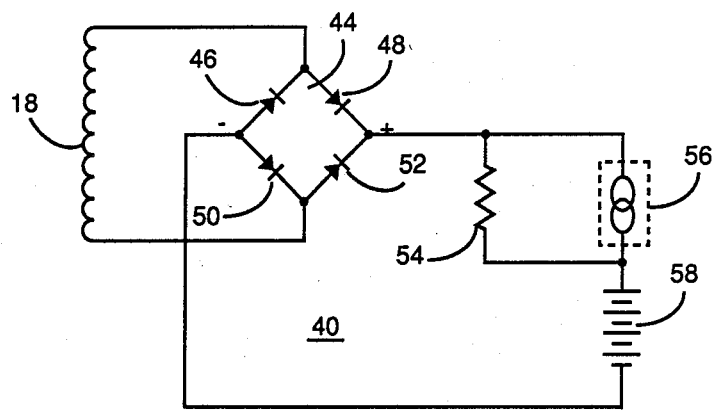
FIG. 2 is a circuit schematic of the control circuit shown as a block in FIG. 1.

Referring to FIG. 2, there is shown a schematic 40 of a circuit corresponding to control circuit 16 shown in FIG. 1. The potential difference established across the terminals of coil 18 is applied to full-wave rectifier circuit 44. When the potential across coil 18 is in the positive part of its cycle, diodes 48 and 50 conduct current, thus creating a current path necessary to charge the battery of electric cells 58. During the negative part of the cycle, a Thermal switch 56 is connected in parallel with resistance 54. One terminal of resistance 54 and switch 56 is connected to the cathodes of diodes 48 and 52, whereas their opposite terminals are connected to the positive end of battery 58. Switch 56 is normally closed; thus, it conducts a substantial amount of current from the rectifier 44 to rapidly charge the battery 58. This mode of operation is known as the rapid-charge mode.

When the battery 58 is substantially (i.e., fully or nearly fully) charged, it generates sufficient heat to open thermal switch 56. At such times, substantially more current flows through resistance 54 to battery 58 than any current flowing through thermal switch 56 (which ideally would not conduct any current). Due to resistance 54, only a trickle of current is applied to the battery 58. Thus, this mode of operation is known as the trickle-charge mode.

Figure 3:
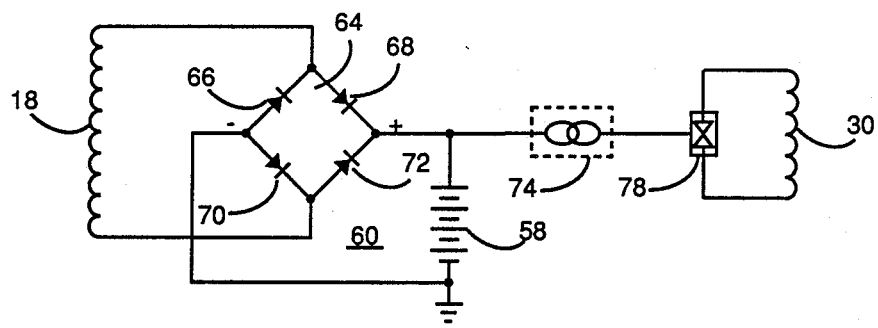
FIG. 3 is a schematic of another possible control circuit.

Referring to FIG. 3, another example of a circuit 60 corresponding to the control circuit 16 of FIG. 1 is shown. As in the circuit of FIG. 2, the terminals of coil 18 are connected to a full-wave rectifier circuit 64 within the control circuit 16. During the positive part of the cycle of the potential across the terminals of coil 18, a charging current path is provided through diodes 68 and 70. Whereas, during the negative part of the cycle, a charging current path is provided through diodes 72 and 66. Thus, full wave rectification is accomplished.

Normally-open thermal switch 74 closes as a result of the heat generated by battery 58 when that battery is substantially charged. When switch 74 is closed it, in turn, causes electronic switch 78 to close, thus shorting the terminals of coil 30 together. When this happens, the reluctance of the magnetic circuit formed by iron-core material 14 and iron-core material 24 increases. This increased reluctance causes the flux through the aforementioned magnetic circuit to decrease to a trickle for operation in the trickle mode.

Before the battery 58 is substantially charged, switch 74 remains open and the circuit consisting of switch 78 and coil 30 does not cause a substantial reduction of the flux flowing in the aforementioned magnetic circuit. This mode of operation is thus also a rapid-charge mode.

What is claimed is:

1. A battery charger for charging at least one electric cell, comprising:
   a substantially u-shaped first iron-core material;
   a substantially u-shaped second iron-core material magnetically coupled to the first iron-core material;
   a primary transformer winding, having a first terminal and a second terminal, magnetically coupled to the first iron-core material and wound around the second iron-core material, for establishing magnetic flux through the first iron-core material in response to a varying voltage applied between the first and second terminals
   a secondary transformer winding coupled to the first iron-core material having a first terminal and a second terminal for establishing a potential between the first terminal and said second terminal, in response to the magnetic flux flowing through the first iron-core material;
   a rectifier coupled to the secondary transformer winding, for rectifying current flowing from the secondary transformer winding for charging of the electric cell;
   control means coupled to the rectifier for controlling the amount of current flowing from the rectifier, whereby the amount of current flowing into the electric cell is substantially reduced when the electric cell is substantially charged;
   a third transformer and winding coupled to said first iron core material for increasing the reluctance of the first iron-core material when the electric cell is substantially charged.

2. The battery charger of claim 1, the terminals of the third transformer winding are shorted together when the electric cell is substantially charged, thus increasing the reluctance of the first iron-core material.

3. The battery charger of claim 2, wherein the first iron-core material has a plurality of air gaps therein, for increasing the reluctance of said first iron-core material.

4. The battery charger of claim 1, further comprising a first housing for holding the first iron-core material.

5. The battery charger of claim 4, wherein said first housing also holds the control means.

6. The battery charger of claim 5, wherein said first housing also holds the electric cell.

7. The battery charger of claim 1, further comprising a second housing for holding the second iron-core material.

8. The battery charger of claim 3, further comprising a first housing for holding the first iron-core material.

9. The battery charger of claim 8, wherein said first housing also holds the control means.

10. The battery charger of claim 3, further comprising a second housing for holding the second iron-core material.

11. The battery charger of claim 10, wherein the second housing also holds the primary winding.

12. The battery charger of claim 11, wherein the second housing has a port wherein the first housing may be inserted for charging of the electric cell.

13. An electric battery comprising:
    an electric cell;
    a housing for holding said electric cell;
    a substantially u-shaped iron-core material;
    a first secondary transformer winding coupled to the iron-core material having a first terminal and a second terminal for establishing a potential between the first terminal and the second terminal, in response to magnetic flux flowing through the iron-core material;
    a rectifier, coupled to the first secondary transformer winding and to the electric cell, for rectifying current flowing from the first secondary transformer winding for charging of the electric cell;
    a control means coupled to the rectifier for controlling the amount of current flowing from the rectifier for charging of the electric cell, whereby the amount of current flowing into the electric cell is substantially reduced when the electric cell is substantially charged;
    a second secondary transformer winding having first and second terminals the second secondary transformer being wound around the iron core material for increasing the reluctance of the iron-core material when the electric cell is substantially charged; and
    means for connecting the first terminal of the second transformer winding to the second terminal of the second transformer winding when the electric cell is substantially charged, thus increasing the reluctance of the iron-core material.

14. The electric battery of claim 13, wherein the iron-core material has a plurality of air gaps therein, for increasing the reluctance of the iron-core material.

15. The electric battery of claim 14, wherein the housing also holds the rectifier.

16. The electric battery of claim 15, wherein the housing also holds the control means.

* * * * *